United States Patent
Fang et al.

(10) Patent No.: US 11,783,792 B2
(45) Date of Patent: Oct. 10, 2023

(54) METHOD AND CIRCUIT FOR DRIVING DISPLAY PANEL, DISPLAY DEVICE, ELECTRONIC APPARATUS, AND MEDIUM

(71) Applicants: Hefei BOE Optoelectronics Technology Co., Ltd., Heifei (CN); BOE TECHNOLOGY GROUP CO., LTD., Beijing (CN)

(72) Inventors: Zhixiang Fang, Beijing (CN); Guanglei Yang, Beijing (CN); Xuxu Hu, Beijing (CN)

(73) Assignees: Hefei BOE Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 496 days.

(21) Appl. No.: 17/040,962

(22) PCT Filed: Nov. 29, 2019

(86) PCT No.: PCT/CN2019/121938
§ 371 (c)(1),
(2) Date: Sep. 23, 2020

(87) PCT Pub. No.: WO2021/102900
PCT Pub. Date: Jun. 3, 2021

(65) Prior Publication Data
US 2023/0121599 A1    Apr. 20, 2023

(51) Int. Cl.
G09G 3/36    (2006.01)
G06F 3/041   (2006.01)

(52) U.S. Cl.
CPC ......... G09G 3/3607 (2013.01); G06F 3/0412 (2013.01); G09G 3/3614 (2013.01); G09G 2320/0233 (2013.01); G09G 2354/00 (2013.01)

(58) Field of Classification Search
CPC ............................ G09G 3/3614; G06F 3/0412
See application file for complete search history.

(56) References Cited

U.S. PATENT DOCUMENTS 6,801,220 B2   10/2004  Greier et al.
11,237,664 B2 *  2/2022  Fang ..................... G06F 3/041
(Continued)

FOREIGN PATENT DOCUMENTS

CN    103366707 A      10/2013
CN    104036744 A  *   9/2014  .......... G09G 3/3614
(Continued)

OTHER PUBLICATIONS

China Patent Office, CN201980002695.8 First Office Action dated Mar. 28, 2022.
(Continued)

*Primary Examiner* — Sanjiv D. Patel
(74) *Attorney, Agent, or Firm* — HOUTTEMAN LAW LLC

(57) ABSTRACT

The method for driving the display panel of the present disclosure includes: acquiring original driving data of an image to be displayed, wherein the original driving data includes a plurality of sub-driving data pieces; the sub-driving data pieces corresponding to a gray scale not exceeding a first threshold value are called first kind sub-driving data pieces, the sub-driving data pieces corresponding to a gray scale not less than a second threshold value are called second kind sub-driving data pieces, and the second threshold value is larger than the first threshold value; judging whether the original driving data satisfies an adjustment condition; and in response to that the original driving data is judged to satisfy the adjustment condition, performing a polarity adjustment on the original driving data to obtain (Continued)

corrected driving data, and driving the display panel to display according to the corrected driving data.

19 Claims, 8 Drawing Sheets

(56) References Cited

U.S. PATENT DOCUMENTS

| | | |
|---|---|---|
| 2012/0062610 A1 | 3/2012 | Tai et al. |
| 2013/0208025 A1 | 8/2013 | Nakahata et al. |
| 2015/0022560 A1 | 1/2015 | Fu et al. |
| 2017/0213501 A1 | 7/2017 | Lim |

FOREIGN PATENT DOCUMENTS

| | | |
|---|---|---|
| CN | 105869594 A | 8/2016 |
| CN | 108628496 A | 10/2018 |
| CN | 108877641 A | 11/2018 |
| CN | 109739461 A | 5/2019 |
| CN | 109872702 A | 6/2019 |
| CN | 110060650 A | 7/2019 |

OTHER PUBLICATIONS

European Patent Office, EP19944647.7 Extended European Search Report dated Nov. 11, 2022.

* cited by examiner

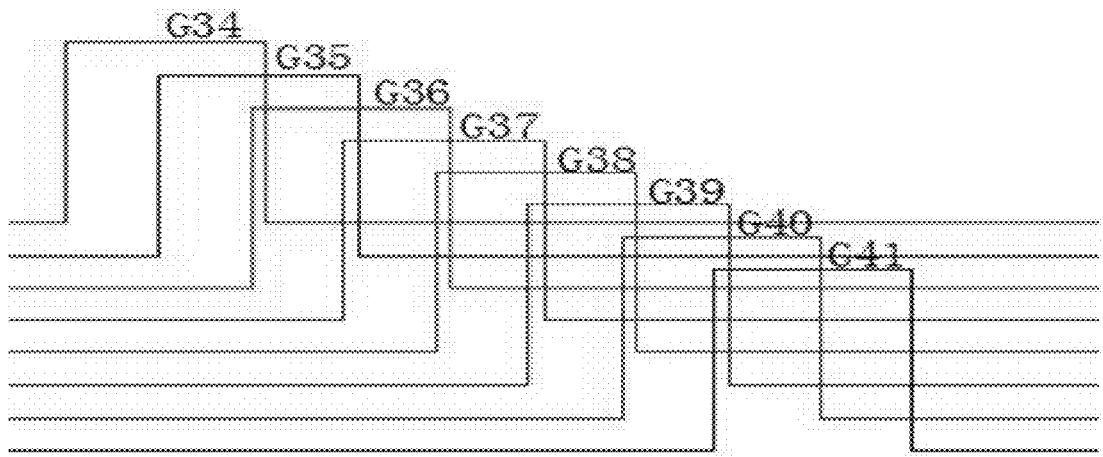
FIG. 3
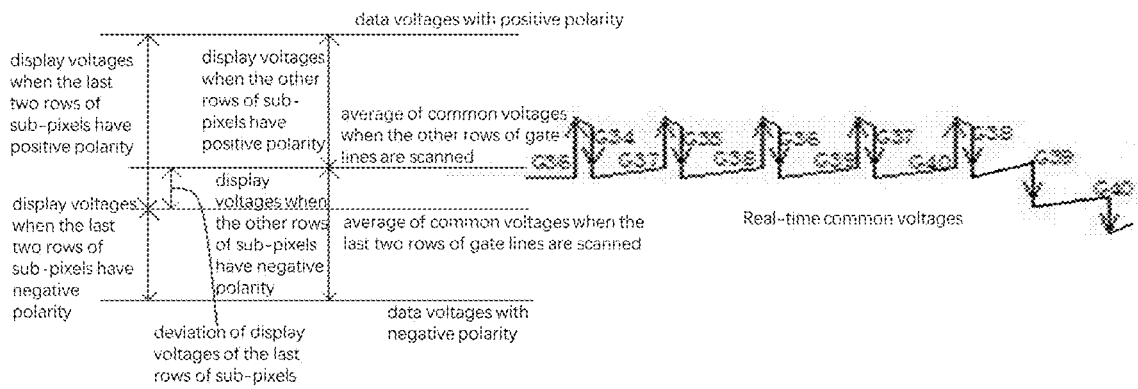
FIG. 4
FIG. 5

METHOD AND CIRCUIT FOR DRIVING DISPLAY PANEL, DISPLAY DEVICE, ELECTRONIC APPARATUS, AND MEDIUM

TECHNICAL FIELD

Embodiments of the present disclosure relate to the field of display technology, and in particular, to a method and a circuit for driving a display panel, a display device, an electronic apparatus, and a computer-readable medium.

BACKGROUND

Touch and Display Driver Integration (TDDI) technology integrates a touch chip and a display chip into a single chip, thereby making a display device have a relative thin profile and a low cost. A TDDI liquid crystal display device usually has a plurality of touch electrodes, and the touch electrodes are multiplexed as a common electrode (i.e., as a common electrode in a display stage, and as themselves in a touch stage).

The TDDI liquid crystal display device may be driven in a column inversion mode, i.e. polarities of data voltages of any two adjacent data lines (any two adjacent columns of sub-pixels) are opposite. Therefore, when the TDDI liquid crystal display device displays an image, a defect such as a bright line is likely to occur at a gap between the touch electrodes.

SUMMARY

The embodiments of the present disclosure provide a method and a circuit for driving a display panel, a display device, an electronic apparatus and a computer readable medium.

In a first aspect, an embodiment of the present disclosure provides a method for driving a display panel, including:

acquiring original driving data with an original polarity mode of an image to be displayed, the original driving data includes a plurality of sub-driving data pieces; the original polarity mode includes: polarities of all the sub-driving data pieces are divided into two kinds; the sub-driving data pieces corresponding to a gray scale not exceeding a first threshold value are called first kind sub-driving data pieces, the sub-driving data pieces corresponding to a gray scale not less than a second threshold value are called second kind sub-driving data pieces, and the second threshold value is larger than the first threshold value;

judging whether the original driving data satisfies an adjustment condition; the adjustment condition includes: the original driving data includes the first kind sub-driving data pieces and the second kind sub-driving data pieces, and numbers of the sub-driving data pieces with two polarities among the second kind sub-driving data pieces are different;

in response to that the original driving data are judged to accord with the adjustment condition, performing a polarity adjustment on the original driving data to obtain corrected driving data, and driving a display panel to display according to the corrected driving data.

In some implementations, the adjustment condition includes:

among the second kind sub-driving data pieces, a ratio of a relative larger number of the sub-driving data pieces with one of the polarities is greater than or equal to 75%.

In some implementations, the adjustment condition includes:

all the second kind sub-driving data pieces have the same polarity.

In some implementations, among the second kind sub-driving data pieces of the original driving data, a ratio of the relative larger number of the sub-driving data pieces with one of the polarities is a first ratio;

among the second kind sub-driving data pieces of the corrected driving data, the number of the sub-driving data pieces with a first polarity is greater than or equal to the number of the sub-driving data pieces with a second polarity, and a ratio of the number of the sub-driving data pieces with the first polarity is a second ratio;

the second ratio is less than the first ratio.

In some implementations, among the second kind sub-driving data pieces of the corrected driving data, the numbers of the sub-driving data pieces with the two polarities are substantially equal.

In some implementations, the performing the polarity adjustment on the original driving data to obtain the corrected driving data includes:

for the second kind sub-driving data pieces of the original driving data, the polarities of a portion of the sub-driving data pieces with the relative larger number are changed.

In some implementations, the original polarity mode includes:

total numbers of the sub-driving data pieces with the two polarities are approximately equal.

In some implementations, the first threshold value is 0 gray level.

In some implementations, the second threshold value differs from the first threshold value by at least 48 gray levels.

In some implementations, the original polarity mode includes:

the polarities of the sub-driving data pieces of the sub-pixels corresponding to any one data line are the same, and the polarities of the sub-driving data pieces of the sub-pixels corresponding to any two adjacent data lines are different.

In some implementations, the performing the polarity adjustment on the original driving data to obtain the corrected driving data includes:

for data lines corresponding to the sub-pixels whose gray scales are at least partially not lower than the second threshold value, changing the polarities of the sub-driving data pieces of the sub-pixels corresponding to a portion of the data lines.

In some implementations, the adjustment condition includes:

for any two adjacent data lines, the gray scales of the sub-pixels corresponding to one of the data lines are not more than the first threshold value, and the gray scales of the sub-pixels corresponding to the other one of the data lines are not less than the second threshold value.

In some implementations, the performing the polarity adjustment on the original driving data to obtain the corrected driving data includes:

for the data lines corresponding to the sub-pixels whose gray scales are not lower than the second threshold value, changing the polarities of the sub-driving data pieces of the sub-pixels corresponding to one data line every other data line.

In some implementations, the performing the polarity adjustment on the original driving data to obtain the corrected driving data includes:

dividing a portion of the data lines into adjustment groups, where each of the adjustment groups is provided with two adjacent data lines, and any two adjacent adjustment groups are provided with two data lines, which are not divided into the adjustment groups, therebetween;

changing all the polarities of the sub-driving data pieces of the sub-pixels corresponding to the data lines in all the adjusting groups.

In some implementations, the method further includes:

in response to that the original driving data is judged not to accord with the adjustment condition, driving the display panel to display according to the original driving data.

In some implementations, each row of sub-pixels of the display panel corresponds to one gate line;

the display panel includes a common electrode, and the common electrode is divided into a plurality of common electrode blocks in a column direction.

In a second aspect, an embodiment of the present disclosure provides a circuit for driving a display panel, including:

an acquisition sub-circuit configured to acquire original driving data with an original polarity mode of an image to be displayed, the original driving data including a plurality of sub-driving data pieces; the original polarity mode includes: polarities of all the sub-driving data pieces are divided into two kinds; the sub-driving data pieces corresponding to a gray scale not exceeding a first threshold value are called first kind sub-driving data pieces, the sub-driving data pieces corresponding to a gray scale not less than a second threshold value are called second kind sub-driving data pieces, and the second threshold value is larger than the first threshold value;

a judgment sub-circuit configured to judge whether the original driving data satisfies an adjustment condition; the adjustment condition includes: the original driving data includes first kind sub-driving data pieces and second kind sub-driving data pieces, and numbers of the sub-driving data pieces with two polarities among the second kind sub-driving data pieces are different;

an adjustment sub-circuit configured to perform a polarity adjustment on the original driving data to obtain corrected driving data in response to that the original driving data satisfies the adjustment condition;

a display driving sub-circuit configured to drive the display panel to display according to the corrected driving data in response to that the original driving data satisfies the adjustment condition.

In a third aspect, an embodiment of the present disclosure provides a display device, including:

a display panel;

the display circuit as above.

In some implementations, each row of sub-pixels of the display panel corresponds to one gate line;

the display panel includes a common electrode, and the common electrode is divided into a plurality of common electrode blocks in a column direction;

the display panel is a touch display panel, and each of the common electrode blocks is multiplexed as a touch electrode;

each column of sub-pixels of the display panel correspond to one data line.

In a fourth aspect, an embodiment of the present disclosure provides an electronic apparatus, including:

one or more processors;

a memory on which one or more programs is stored that, the programs, when executed by the one or more processors, cause the one or more processors to implement the method for driving the display panel as above;

one or more I/O interfaces coupled between the processors and the memory and configured to realize information interaction between the processors and the memory.

In a fifth aspect, an embodiment of the present disclosure provides a computer-readable medium, on which a computer program is stored, the computer program, when executed by a processor, implements the method for driving the display panel as above.

DESCRIPTION OF DRAWINGS

The accompanying drawings are included to provide a further understanding of the embodiments of the present disclosure, constitute a part of the specification, explain the present disclosure together with the embodiments of the present disclosure and not to limit the present disclosure. Above and other features and advantages of the present disclosure will become more apparent to those skilled in the art by describing in detail exemplary embodiments with reference to the attached drawings, in which:

FIG. 3 is a schematic diagram illustrating a driving timing sequence of a portion of gate lines in a display panel according to an embodiment of the present disclosure;

FIG. 4 is a schematic diagram illustrating an effect of coupling on voltage in a display panel according to an embodiment of the present disclosure;

FIG. 5 is a schematic diagram illustrating a heavy-duty image displayed by a display panel according to an embodiment of the present disclosure;

FIG. 13 is a schematic diagram of the heavy-duty image shown in FIG. 5 subjected to another polarity adjustment;

FIG. 14 is a schematic diagram of the heavy-duty image shown in FIG. 6 subjected to another polarity adjustment;

DESCRIPTION OF EMBODIMENTS

Figure 1:
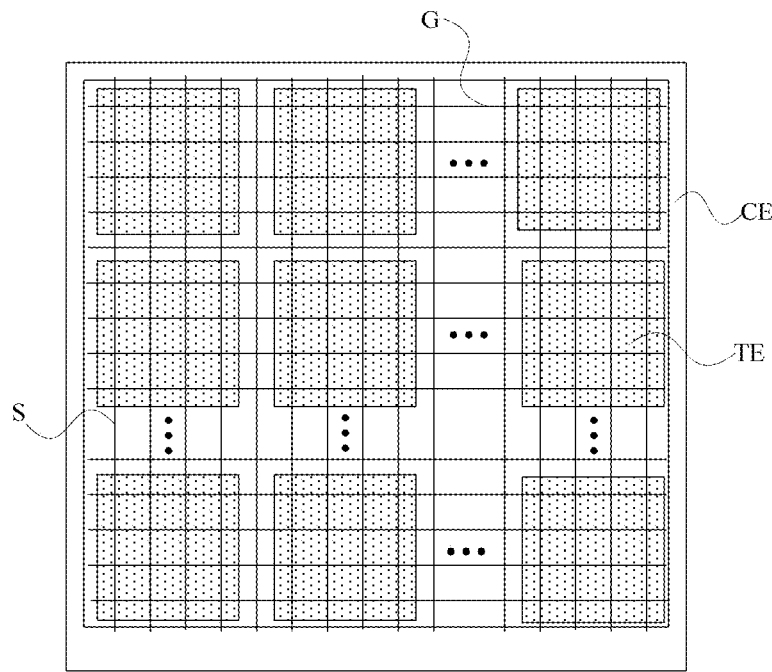
FIG. 1 is a schematic partial structure diagram of a display panel according to an embodiment of the present disclosure.

In order to make those skilled in the art better understand the technical solutions of the embodiments of the present disclosure, the method and the circuit for driving the display panel, the display device, the electronic apparatus, and the computer-readable medium provided in the embodiments of the present disclosure are described in detail below with reference to the accompanying drawings.

The embodiments of the present disclosure will be described more fully hereinafter with reference to the accompanying drawings, but the embodiments shown may be embodied in different forms and should not be construed as a limitation. Rather, these embodiments are provided so that the present disclosure will be thorough and complete, and will fully convey the scope of the present disclosure to those skilled in the art.

The embodiments of the present disclosure may be described with reference to a plan and/or a cross-sectional view by aid of idealized schematic illustrations of the present disclosure. Accordingly, the example illustrations may be modified in accordance with manufacturing techniques and/or tolerances.

The embodiments of the present disclosure and features of the embodiments may be combined with each other without conflict.

The terminologies used in the present disclosure are for a purpose of describing particular embodiments only and are not intended to limit the present disclosure. As used in the present disclosure, the term "and/or" includes any and all combinations of one or more of the associated listed items. As used in the present disclosure, the singular forms "a", "an" and "the" are intended to include the plural forms as well, unless the context clearly indicates otherwise. The terms "include", "comprise" and variants thereof as used in the present disclosure, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used in the present disclosure have the same meaning as commonly understood by one of ordinary skill in the art. It will be further understood that the terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The embodiments of the present disclosure are not limited to the embodiments shown in the drawings, but include modifications of configurations formed based on a manufacturing process. Thus, the regions illustrated in the figures have schematic properties, and the shapes of the regions shown in the figures illustrate specific shapes of the regions of elements, but are not intended to be a limitation.

In a first aspect, an embodiment of the present disclosure provides a method for driving a display panel.

The method of the embodiment of the present disclosure is used for driving the display panel to display, that is, providing data voltages for realizing display to sub-pixels of the display panel according to an image to be displayed, so that the display panel actually displays the image to be displayed.

Referring to FIG. 1, the display panel (liquid crystal display panel) includes a plurality of gate lines G extending along a row direction and a plurality of data lines S extending along a column direction, where regions defined by intersections of the gate lines G and the data lines S define sub-pixels (not shown), each of the sub-pixels has an independent pixel electrode (not shown), and each pixel electrode is independently loaded with the data voltage to independently display. Further, the liquid crystal display panel further includes a common electrode CE common to all the sub-pixels, which is applied with a uniform common voltage. For each of the sub-pixels, a voltage difference between the common electrode CE and the pixel electrode corresponding thereto is called a "display voltage" of the sub-pixel, and the display voltage can drive liquid crystal molecules at the sub-pixel to deflect, so that the sub-pixel displays a required brightness.

It should be understood that, in the drawings, "row" is represented as "horizontal direction" in the display panel, and "column" are represented as "vertical direction" in the display panel; however, in theory, as long as "row" and "column" are two directions intersecting with each other, for example, "row" and "column" may be perpendicular to each other, which is independent to a placement of the display panel.

It should be understood that the sub-pixels may be divided into sub-pixels of different colors to achieve a color display. For example, all the sub-pixels may be divided into sub-pixels of three colors of red (R), green (G) and blue (B), and the sub-pixels in a same column have a same color, while the sub-pixels in adjacent columns have different colors (e.g., the sub-pixels are arranged alternatively in red sub-pixel column, green sub-pixel column and blue sub-pixel column).

The display panel can scan the gate lines line by line for displaying each frame (i.e., each image), when any gate line is scanned (loaded with an active signal), the data lines provide required data voltages for the sub-pixels corresponding to the gate line, and each of the sub-pixels can store a difference (display voltage) between the data voltage and the common voltage, and drives the liquid crystal molecules to deflect through the display voltage for continuously displaying the frame until the next frame.

A gray scale (brightness) of the sub-pixel is determined by an absolute value of the display voltage, i.e., the data voltage (because the common voltage is constant), and according to the fact that the data voltage is higher or lower than the common voltage, the data voltages corresponding to various gray scales can have two polarities, i.e., a positive polarity (i.e., the data voltage is higher than the common voltage and is denoted as "+") and a negative polarity (i.e., the data voltage is lower than the common voltage and is denoted as "−").

The gate lines, the data lines, and the common electrode (touch electrodes) are usually located in different film layers and separated from each other by insulating layers, and the gate lines and the data lines are respectively overlapped with the common electrode (i.e., opposite areas exist between the gate lines, the data lines and the common electrode).

Figure 2:
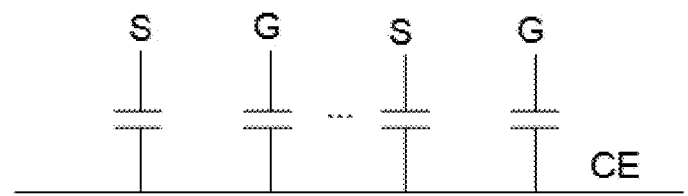
FIG. 2 is a schematic diagram illustrating a parasitic capacitance generated in a display panel according to an embodiment of the present disclosure.

Thus, referring to FIG. 2, there are parasitic capacitances between the gate lines G and the common electrode CE, and between the data lines S and the common electrode CE, respectively, i.e., voltages in the gate lines G and the data lines S may affect a common voltage of the common electrode CE through a coupling effect.

In some implementations, the common electrode is divided into a plurality of common electrode blocks in the column direction, and each row of sub-pixels of the display panel corresponds to one gate line.

Figures 6, 7:
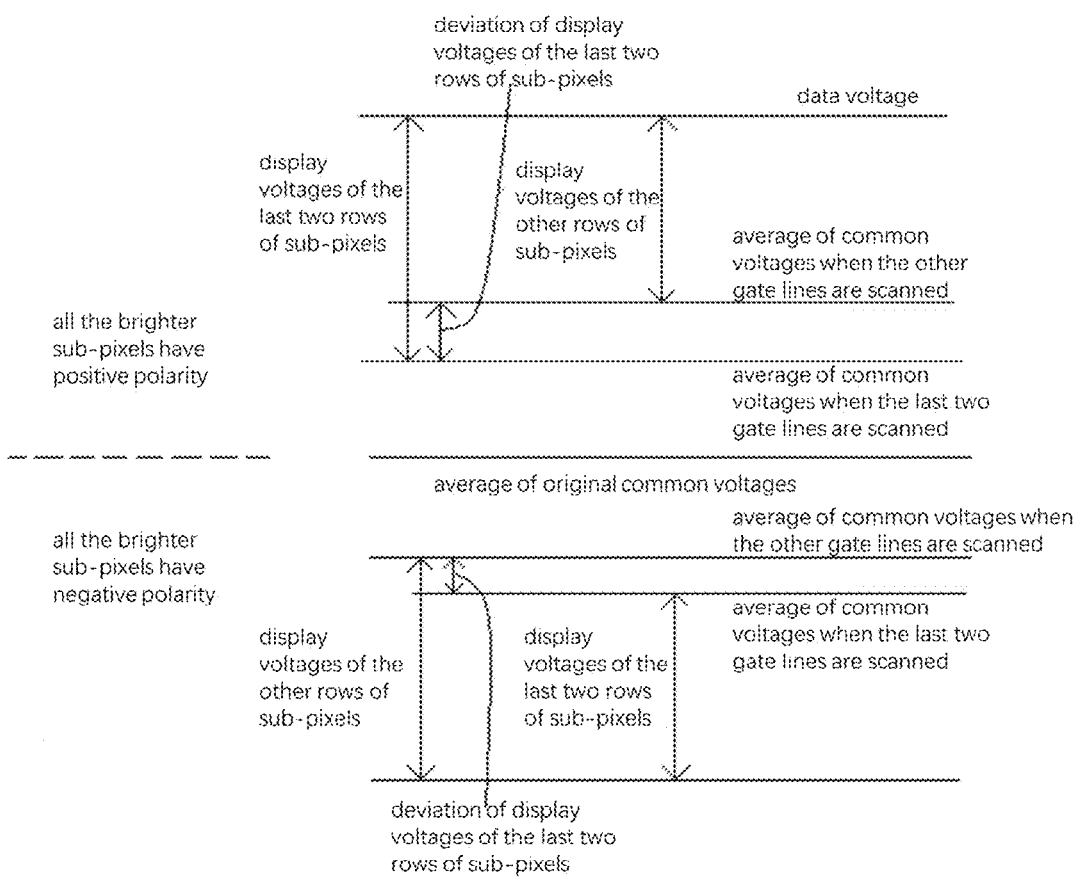
FIG. 6 is a schematic diagram of another heavy-duty image displayed by a display panel according to an embodiment of the present disclosure.
FIG. 7 is a schematic diagram illustrating an effect of coupling on voltage when a heavy-duty image is displayed by a display panel according to an embodiment of the present disclosure.

Referring to FIGS. 5 and 6, the sub-pixels in the display panel may be arranged in an array, and for simplicity, each row of sub-pixels may correspond to one gate line, and the gate lines extend along the row direction.

Moreover, although theoretically the common electrode could be one "bulk", based on some needs, referring to FIG. 1, the common electrode CE may be divided into a plurality of mutually insulated portions (common electrode blocks) in the column direction. That is, the common electrode CE is divided into a plurality of independent portions by a plurality of "gaps (spaces)" extending in the row direction, so the gaps are parallel to the gate lines. Since the gap is very narrow, normally, there is no gate line located right in the gap, and thus the gate lines substantially overlap the common electrode.

Certainly, the common electrode CE may be divided into a plurality of common electrode blocks in the row direction, that is, the common electrode CE may have a gap extending in the column direction (the gap is generally parallel to the data line), so that the common electrode blocks are arranged in an array.

In some implementations, referring to FIG. 1, the display panel is a touch display panel, and each of the common electrode blocks is multiplexed as a touch electrode TE.

When the display panel is a touch display panel with both a display function and a touch function, the common electrode blocks can be multiplexed as touch electrodes TE, that is, in a display stage, all the common electrode blocks (i.e., the common electrode CE) are loaded with a same common voltage to realize display; in a touch stage, each of the common electrode blocks (i.e., the touch electrodes TE) serves as an individual touch sensing electrode to achieve a touch control in an area where the common electrode block is located.

Therefore, the display panel adopts a Touch and Display Driver Integration (TDDI) technology, and has a relative thin profile and a low cost.

Certainly, it is also feasible if the common electrode blocks are not multiplexed as the touch electrodes, and the common electrode is merely partitioned for some other reasons (e.g., for uniform power supply or for zonally controlling the common voltage).

In some implementations, each column of sub-pixels of the display panel correspond to one data line.

Referring to FIGS. 5 and 6, when the sub-pixels of the display panel are arranged in an array, for simplicity, each column of sub-pixels may correspond to one data line.

Hereinafter, a description will be given by taking a case in which the display panel has a plurality of common electrode blocks and a plurality of gate lines as an example. Referring to FIG. 1, when the display panel has the common electrode blocks (touch electrodes TE) and the gate lines G, each of the common electrode blocks is adjacent to only a portion of the gate lines G, and a variation of common voltage in the common electrode blocks when the gate lines G corresponding to edges of the common electrode blocks are scanned may be different from that when the gate lines G corresponding to centers of the common electrode blocks are scanned.

Exemplary, further description is made with reference to FIGS. 3, 4, and 7.

In FIG. 3, a line denoted by Gm (m is an integer between 34 and 41 in the drawing) indicates a change of common voltage with time in the mth gate line Gm (the more upward the line is, the higher the voltage is, the same applies hereinafter).

It should be understood that, in FIG. 3, high levels of the gate lines are actually equal, and low levels of the gate lines are actually equal, and a difference between the high levels and a difference between the low levels are shown in the figure for convenience of distinction.

A right side of the graph shown in FIG. 4 illustrates a real-time value of change of common voltage of the common electrode block with time, wherein Gm at each abrupt change of the common voltage indicates that the abrupt change is caused by a rising edge or a falling edge of the active signal in the gate line Gm; while a left side of FIG. 4 and FIG. 7 show average values of voltage equivalents and voltage differences correspondingly resulted.

Referring to FIG. 3, the rising edge of the active signal of each gate line and the falling edge of the active signal of the second gate line ahead arrive almost at the same time, so referring to FIG. 4, although the common voltage is suddenly increased or decreased by the coupling effect of the rising edge and the falling edge of the active signal respectively when the gate line is scanned (loaded with the active signal), a time duration in which the common voltage is actually changed by the active signal is usually short, and the display is hardly influenced.

Referring to FIG. 4, after the rising edge of the active signal of the last gate line (hereinafter, taking the gate line G40 as an example) corresponding to a present (certain) one of the common electrode blocks and the falling edge of the active signal of the third from last gate line G38 corresponding to the certain one of the common electrode blocks arrive in sequence, the next gate line G41 (not shown in the figure) corresponds to the next one of the common electrode blocks and thus will not affect the present one of the common electrode blocks; therefore, the present one of the common electrode blocks is subsequently and continuously influenced by falling edges of active signals of the penultimate gate line G39 and the last gate line G40, and the common voltage in the present one of the common electrode blocks is continuously reduced.

Thus, referring to FIG. 4, among display voltages stored by the last two rows of sub-pixels corresponding to the last two gate lines G39 and G40 (the last two rows of sub-pixels corresponding to the present one of the common electrode blocks), the common voltage is relative low, which may cause the following effects:

when the data voltages of the last two rows of sub-pixels are positive, the display voltages of the last two rows of sub-pixels are greater than the display voltages of the other rows of sub-pixels (corresponding to the present one of the common electrode blocks, except the last two rows of sub-pixels), and a deviation exists therebetween, therefore, the last two rows of sub-pixels are brighter than the other rows of sub-pixels when the data voltages are positive;

when the data voltages of the last two rows of sub-pixels are negative, the display voltages of the last two rows of sub-pixels are less than the display voltages of the other rows of sub-pixels, and a deviation exists therebetween; absolute values of the deviations mentioned above are the same, therefore, the last two rows of sub-pixels are darker than the other rows of sub-pixels when the data voltages are negative, and a degree of darkening is the same as a degree of brightening mentioned above.

Since the polarities of each of the sub-pixels in adjacent frames are different (i.e., polarity inversion is performed), for any sub-pixel in the last two rows of sub-pixels, it is always "bright-dark" alternately, and the degree of brightening is the same as the degree of darkening, and an overall brightness of the last two rows of sub-pixels is the same as that of the other rows of sub-pixels.

However, the situation will change when some of the sub-pixels in the image are darker, some of the sub-pixels in the image are brighter, and the data voltages of the brighter sub-pixels are of substantially the same polarity.

The image in which the brightness difference between the different sub-pixels is relative large and the data voltages of the brighter sub-pixels are of substantially the same polarity is called a heavy-duty image or a flicker image.

For example, referring to FIGS. 5 and 6, it is assumed that the display panel adopts the "column inversion" mode, odd-numbered columns of sub-pixels in the image to be displayed are all brighter (for example, all have a gray scale of 127), and have the same polarity; even-numbered columns of sub-pixels are darker (e.g. all have a 0 gray scale) and have the same polarity (certainly, opposite to that of the odd-numbered columns of sub-pixels), that is, the image is actually in a form of "brighter every other column" or "brighter and darker alternatively in columns".

As shown in FIGS. 5 and 6, the black sub-pixel represents the darker (e.g., 0 gray scale) sub-pixel, and the white sub-pixel represents the brighter (e.g., 127 gray scale) sub-pixel; the "+" sign indicates that the data voltage of the sub-pixel has a positive polarity, and the "−" sign indicates that the data voltage of the sub-pixel has a negative polarity, the same applies hereinafter.

It should be understood that although the odd-numbered columns of sub-pixels being brighter and the even-numbered columns of sub-pixels being darker are taken as an example above, the same is true for the case in which the even-numbered columns of sub-pixels are brighter and the odd-numbered columns of sub-pixels are darker, and thus the description is not repeated.

Alternatively, it is also feasible that brighter and darker sub-pixels in the image are arranged alternately in any other way, as long as the brighter sub-pixels correspond to the same polarity, which will not be described again herein.

It can be seen that the data voltages of the darker sub-pixels are very close to or even equal to the common voltage, and thus their coupling effect to the common voltage is not obvious; in contrast, the data voltages of the brighter sub-pixels are much different from the common voltage, and thus their coupling effect to the common voltage is more obvious.

Therefore, when the image is the heavy-duty image as described with reference to FIGS. 5 and 6, the data voltages (data voltages of the brighter sub-pixels) that deviate largely from the common voltage in each frame have substantially the same polarity (i.e., are entirely greater than the common voltage or entirely less than the common voltage). Referring to FIG. 7, the data voltages having the same deviation direction and deviate largely from the common voltage causes the common voltage to be entirely increased (when the brighter sub-pixels mainly correspond to the positive polarity) or entirely decreased (when the brighter sub-pixels mainly correspond to the negative polarity), and further causes the brightness of all the sub-pixels to be dark. Certainly, since the above effects are the same for most of the sub-pixels, the display is not substantially affected.

However, referring to FIG. 7, when the last two gate lines corresponding to the common electrode block are scanned, for the frame where the common voltage is entirely increased (the brighter sub-pixels mainly correspond to the positive polarity), the common voltage will be pulled down to an increased degree by the active signals of the gate lines (the common voltage is higher than original and thus is more easily pulled down), that is, the display voltages of the sub-pixels corresponding to the positive polarity in the last two rows have a larger deviation from the display voltages of the sub-pixels in the other rows, that is, the sub-pixels corresponding to the positive polarity in the last two rows are "brighter to a larger degree".

For the frame with the common voltage overall reduced (the brighter sub-pixels mainly correspond to the negative polarity), the common voltage is pulled down to a reduced degree by the active signals of the last two gate lines (the common voltage is lower than original and thus is not easy to be pulled down further), and the deviation of the display voltages of the sub-pixels corresponding to the negative polarity in the last two rows from the sub-pixels in other rows is smaller, that is, the sub-pixels corresponding to the negative polarity in the last two rows are "darker to a smaller degree".

Therefore, when displaying (multiple frames) continuously, each of the sub-pixels in the last two rows is always alternately "brighter to a larger degree-darker to a smaller degree (or "brighter more")", and thus the overall brightness of the last two rows of sub-pixels is brighter than that of the other rows of sub-pixels, and a visible "bright line" or "cross stripe" may be generated at an edge of the common electrode block, which affects the display.

Figure 8:
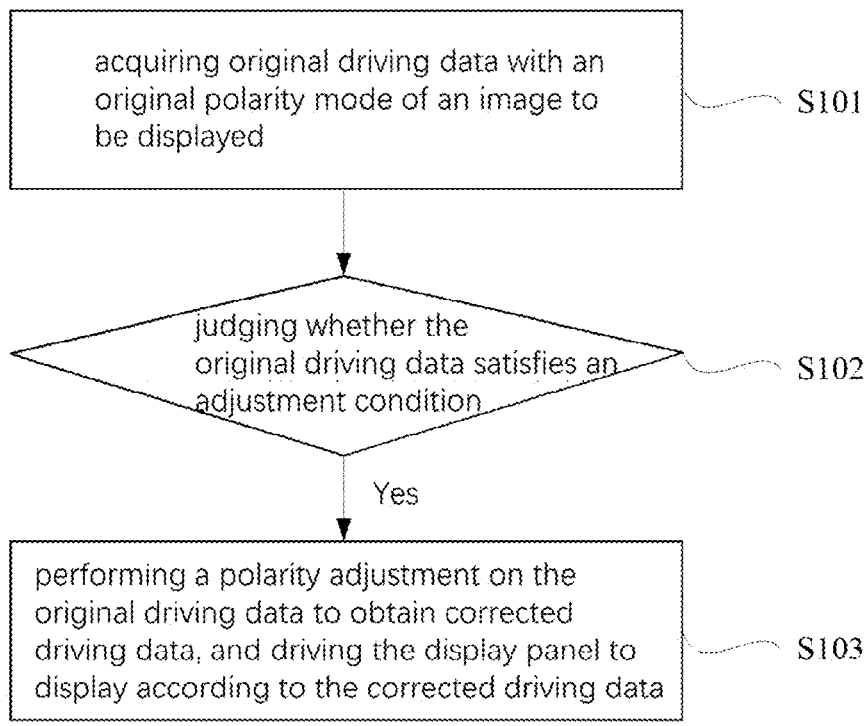
FIG. 8 is a flowchart of a method for driving a display panel according to an embodiment of the present disclosure.

Specifically, referring to FIG. 8, the method for driving the display panel according to the embodiment of the present disclosure includes the following steps S101 to S103.

S101, acquiring original driving data with an original polarity mode of an image to be displayed.

The original driving data includes a plurality of sub-driving data pieces.

The original polarity mode includes: the polarities of all the sub-driving data pieces are divided into two kinds.

The sub-driving data pieces corresponding to a gray scale not exceeding a first threshold value are called first kind sub-driving data pieces, the sub-driving data pieces corresponding to a gray scale not less than a second threshold value are called second kind sub-driving data pieces, and the second threshold value is larger than the first threshold value.

The image to be displayed is an image desired to be displayed by the display panel, and includes a plurality of sub-pixels (image dots), and gray scales (brightness) of the sub-pixels. The driving data includes the sub-driving data pieces of all the sub-pixels, and the sub-driving data pieces are specifically data voltages corresponding to the gray scales of the sub-pixels, that is, when the data voltages corresponding to the sub-driving data pieces are loaded on pixel electrodes of the sub-pixels, the sub-pixels can display corresponding gray scales (brightness).

It can be seen that the polarities of the sub-driving data pieces (data voltages) corresponding to the same gray scale can be divided into two different polarities, that is, positive polarity and negative polarity, according to the data voltages relative to the common voltage, i.e., each of the sub-driving data pieces has a polarity.

Meanwhile, the sub-driving data pieces may be divided into two kinds according to the gray scales corresponding to the sub-driving data pieces (i.e., the gray scales of the sub-pixels having the sub-driving data pieces). The sub-driving data pieces corresponding to the lower gray scales (not exceeding the first threshold value) are defined as the first kind sub-driving data pieces, and the sub-driving data pieces corresponding to the higher gray scales (not lower than the second threshold value) are defined as the second kind sub-driving data pieces.

In this step (S101), the original driving data corresponding to an image to be displayed is acquired, the gray scales corresponding to the sub-driving data pieces of the original driving data are gray scales of the sub-pixels of the image to be displayed, and a polarity of each of the sub-driving data pieces is directly generated according to a default manner specified by the display panel, that is, the original driving data conforms to the original polarity mode. Therefore, without the method of the embodiment of the present disclosure, the driving data generated by the display panel "originally" is the original driving data, and the display panel displays directly according to the original driving data.

The original polarity mode includes: polarities of all the sub-driving data pieces are divided into two kinds.

That is, according to the original polarity mode defined by the display panel, the polarities of all the sub-driving data pieces of the original driving data cannot be all the same, but some of the sub-driving data pieces must be positive, and the rest of the sub-driving data pieces must be negative.

In some implementations, the original polarity mode includes: total numbers of sub-driving data pieces of two polarities are approximately equal.

That is, according to the further original polarity mode, the numbers of sub-driving data pieces of two polarities in the original driving data should be substantially the same. For example, by taking the number of the sub-driving data pieces of one polarity as a reference, the number of the sub-driving data pieces of the other polarity should be different from the reference by less than 5%, or less than 3%, or less than 1%.

Certainly, as an optimal way, the number of the sub-driving data pieces of the positive polarity in the original driving data may be exactly equal to the number of the sub-driving data pieces of the negative polarity.

In some implementations, the original polarity mode includes: the polarities of the sub-driving data pieces of the sub-pixels corresponding to any one data line are the same, and the polarities of the sub-driving data pieces of the sub-pixels corresponding to any two adjacent data lines are different.

That is, according to the further original polarity mode, the polarities of the sub-driving data pieces of the sub-pixels corresponding to each data line of the display panel are the same, while the polarities of the sub-driving data pieces of the sub-pixels corresponding to any adjacent data lines are different. For example, referring to FIGS. 5 and 6, when each column of sub-pixels corresponds to one data line, according to the above original polarity mode, the polarities of the sub-driving data pieces of each column of sub-pixels should be the same, and the polarities of the sub-driving data pieces of any adjacent columns of sub-pixels should be different, that is, the display panel is driven in a "column inversion" mode.

Certainly, it should be understood that the original driving data is for the image (or the frame) to be displayed, and thus the above original polarity mode is the condition satisfied by the original driving data. In general, since polarity inversion is required, the polarities of the sub-driving data pieces of each sub-pixel are opposite in any two adjacent frames.

S102, judging whether the original driving data satisfies an adjustment condition.

After the original driving data is acquired, whether the original driving data satisfies a preset adjustment condition is judged; when the adjustment condition is satisfied, it indicates that the display directly performed according to the original driving data may cause a failure, and thus the polarity of the original driving data needs to be adjusted (see step S103).

The adjustment condition includes: the original driving data includes first kind sub-driving data pieces and second kind sub-driving data pieces, and numbers of sub-driving data pieces with two polarities in the second kind sub-driving data pieces are different.

That is, the original driving data satisfying the above adjustment condition should be: gray scales of a portion of the sub-pixels in the image to be displayed are smaller than or equal to a first threshold value, the portion of the sub-pixels are first kind sub-pixels (darker sub-pixels), and the sub-driving data pieces of the portion of the sub-pixels are first kind sub-driving data pieces; gray scales of another portion of the sub-pixels in the image to be displayed are greater than or equal to a second threshold value (which is greater than the first threshold value), the another portion of the sub-pixels are second kind sub-pixels (brighter sub-pixels), and the sub-driving data pieces of the another portion of the sub-pixels are second kind sub-driving data pieces; and among the second kind sub-driving data pieces, the numbers of the sub-driving data pieces of two polarities are different.

Alternatively, the image to be displayed that satisfies the adjustment condition is the above heavy-duty image or flicker image: a portion of the sub-pixels in the image to be displayed have lower brightness, another portion of the sub-pixels in the image to be displayed have higher brightness, and the sub-pixels with higher brightness basically correspond to the same polarity; therefore, the data voltages (data voltages of the brighter sub-pixels) having a large deviation from the common voltage have the same polarity (i.e., larger than the common voltage entirely or smaller than the common voltage entirely), and a bright line defect is easily caused.

In some implementations, the first threshold value is a 0 gray level.

That is, according to the further adjustment condition, the first kind sub-pixels may be considered as the sub-pixels with zero brightness (or not lit). Certainly, the data voltages of the first kind sub-pixels with 0 gray scale are necessarily equal to the common voltage, but the polarities of the first kind sub-driving data pieces are still theoretically divided into two polarities.

Correspondingly, in such case, the second threshold value may be considered as a 1 gray scale, that is, the sub-pixels with the brightness not equal to zero are all the second kind sub-pixels; alternatively, the second threshold value may be considered as a specific value larger than 1 gray level, i.e., the sub-pixels which must reach a certain brightness are the second kind sub-pixels.

In some implementations, the second threshold differs from the first threshold by at least 48 gray levels.

Obviously, with all other factors being equal, the larger the difference in brightness between the brighter and darker sub-pixels, the more pronounced the above "bright line". It is found that, through research, the further adjustment condition may specify that the second threshold value is greater than the first threshold by at least 48 gray levels, that is, the "brightness difference" between the second kind sub-pixels and the first kind sub-pixels must reach a value corresponding to 48 gray levels, in this case, the problem of "bright line" is more likely to occur.

Certainly, a minimum value of the difference between the second threshold value and the first threshold value may be other values such as 2 gray scale, 5 gray scale, 10 gray scale, 20 gray scale, 36 gray scale, 60 gray scale, 80 gray scale, 100 gray scale, and so on.

In some implementations, the adjustment condition includes: among the second kind sub-driving data pieces, a ratio of a relative larger number of sub-driving data pieces of one of the polarities is equal to or greater than 75%.

Among the second kind sub-driving data pieces, the sub-driving data pieces of two polarities are different in number, and thus it is necessary that the number of the sub-driving data pieces of one polarity is larger, and the number of the sub-driving data pieces of the other polarity is smaller, wherein the ratio of the larger number of the sub-driving data pieces of the one polarity to the number of all the second kind sub-driving data pieces is a first ratio.

Further, it is clear that, with all other factors being equal, the larger the first ratio (i.e. the larger the difference in number of the sub-pixels of two polarities among the brighter sub-pixels), the more pronounced the above "bright line". It is found, through research, that the further adjustment condition may specify that a minimum value of the above first ratio should be 75%, and correspondingly, the ratio of the smaller number of the sub-driving data pieces of the other polarity should not exceed 25%, and in such case, the problem of "bright line" is more likely to occur.

Certainly, the minimum value of the above first ratio may be other values such as 60%, 70%, 90%, 95%, 99%, and so on.

In some implementations, the adjustment condition includes: all the second kind sub-driving data pieces have the same polarity.

That is, according to the further adjustment condition, it may be provided that all the second kind sub-driving pieces are of the same polarity, i.e., the first ratio mentioned above is 100% while a ratio of the number of the sub-driving data pieces of the other polarity is 0%.

In some implementations, when the original polarity mode includes: the polarities of the sub-driving data pieces of the sub-pixels corresponding to any one data line are the same, the polarities of the sub-driving data pieces of the sub-pixels corresponding to any two adjacent data lines are different; the adjustment condition includes: the gray scales of the sub-pixels corresponding to one data line in any two adjacent data lines are not greater than the first threshold value, and the gray scales of the sub-pixels corresponding to the other data line are not less than the second threshold value.

According to the original polarity mode, when the polarities of the sub-driving data pieces of the sub-pixels corresponding to each data line are the same, the adjustment condition may specify that each data line corresponds to the same kind sub-pixels. In other words, in the original driving data that satisfies the adjustment condition, one data line of any two adjacent data lines corresponds to darker sub-pixels (first kind sub-pixels), and the sub-driving data pieces corresponding thereto have one polarity, and the other data line corresponds to brighter sub-pixels (second kind sub-pixels), and the sub-driving data pieces corresponding thereto have the other polarity.

Since the sub-pixels (e.g. a column of sub-pixels) corresponding to a same data line in the display panel are usually of the same color, the above situation is often observed when some pure color pictures (e.g., green-violet pictures) are displayed.

Certainly, it should be understood that since the above "bright line" is essentially caused by the common electrode blocks, it is actually feasible that the adjustment condition defines the gray scales (polarities) of the sub-pixels corresponding to the same data line and corresponding to the same common electrode block being the same.

More specifically, when each column of sub-pixels corresponds to one data line, the original polarity mode is "column inversion", and thus the image to be displayed may be in a form of "brighter every other column" or "brighter and darker alternatively in columns" as shown in FIGS. 5 and 6.

S103, in response to that the original driving data are judged to satisfy the adjustment condition, performing a polarity adjustment on the original driving data to obtain corrected driving data, and driving the display panel to display according to the corrected driving data.

When the original driving data is judged to satisfy the adjustment condition, it is indicated that the display performed directly according to the original driving data may cause a defect, and thus the polarity adjustment needs to be performed on the original driving data to obtain the corrected driving data, and the display panel is driven to display according to the corrected driving data.

In the above polarity adjustment, only the polarities of the sub-driving data pieces of the sub-pixels are changed, but the gray scales corresponding to the sub-driving data pieces are not changed (i.e., the gray scales of the sub-pixels are not changed). Therefore, from a perspective of gray scales (brightness), the corrected driving data obtained by the polarity adjustment still completely corresponds to the image to be displayed, i.e., the kinds (first kind, second kind) of all the sub-pixels (sub-driving data pieces) are not changed, and only the polarities of a portion of the sub-driving data pieces are changed.

In some implementations, among the second kind sub-driving data pieces of the corrected driving data, the number of the sub-driving data pieces of the first polarity is greater than or equal to the number of the sub-driving data pieces of the second polarity, and the ratio of the number of the sub-driving data pieces of the first polarity is a second ratio; the second ratio is less than the above first ratio.

Among the second kind sub-driving data pieces of the original driving data, the ratio of the relative larger number of sub-driving data pieces of one polarity is the first ratio as above; and among the second kind sub-driving data pieces of the corrected driving data, there are "not a few" sub-driving data pieces of one polarity (which may be more than or have the same number as the sub-driving data pieces of the other polarity), and a ratio of the number of the sub-driving data pieces of this polarity is the second ratio.

The second ratio must be smaller than the first ratio, that is, after the polarity adjustment, among the second kind sub-driving data pieces, the numbers of the sub-driving data pieces of two polarities must be "relatively more balanced", so that when the display panel is driven according to the corrected driving data, the defect (such as bright line defect) can be eliminated or the defect degree can be reduced.

In some implementations, among the second kind sub-driving data pieces of the corrected driving data, the numbers of sub-driving data pieces of two polarities are substantially equal.

That is, among the second kind sub-driving data pieces of the corrected driving data, the second ratio may be about 50% (or may be equal to 50%), so as to substantially eliminate the difference in number of the sub-driving data pieces of different polarities among the second kind sub-driving data pieces of the corrected driving data.

It should be understood that, in the above polarity adjustment process, as long as the second ratio is lower than the first ratio, but it does not represent that the polarity which the larger number of sub-driving data pieces have in the second kind sub-driving data pieces of the corrected driving data is the polarity which the larger number of sub-driving data pieces have in the second kind sub-driving data pieces of the original driving data, i.e., the original larger number of sub-driving data pieces of the polarity may be changed to the smaller number of sub-driving data pieces of the polarity.

In some implementations, the polarity adjustment includes: among the second kind sub-driving data pieces of the original driving data, changing the polarity of a portion of the sub-driving data pieces in the larger number of sub-driving data pieces of the polarity.

Obviously, in order to make the difference of ratios of the numbers of sub-driving data pieces of two polarities in the second kind sub-driving data pieces be smaller, the polarity of a portion of the sub-driving data pieces in the originally larger number of sub-driving data pieces of the polarity among the second kind sub-driving data pieces should be changed to the other polarity to reduce the ratio of the number.

Certainly, the polarity of a portion of the sub-driving data pieces in the original smaller number of sub-driving data pieces of the polarity among the second kind sub-driving data pieces of the original driving data may also be changed; and/or, the polarity of a portion of the first kind sub-driving data pieces of the original driving data may also be changed.

In some implementations, when the original polarity mode includes: the polarities of the sub-driving data pieces of the sub-pixels corresponding to any one data line are the same, and the polarities of the sub-driving data pieces of the sub-pixels corresponding to any two adjacent data lines are different; the polarity adjustment includes: for the data lines that the gray scales of the sub-pixels corresponding thereto are at least partially not lower than the second threshold value, changing the polarity of the sub-driving data pieces of the sub-pixels corresponding to a portion of the data lines.

When the polarities of the sub-driving data pieces of the sub-pixels corresponding to each data line are the same, the polarities of the sub-driving data pieces of the sub-pixels corresponding to the entire data line may be changed to realize the polarity adjustment, and the adjustment is integrally performed by taking the data line as a unit, and thus the adjustment is convenient to be realized.

Figure 9:
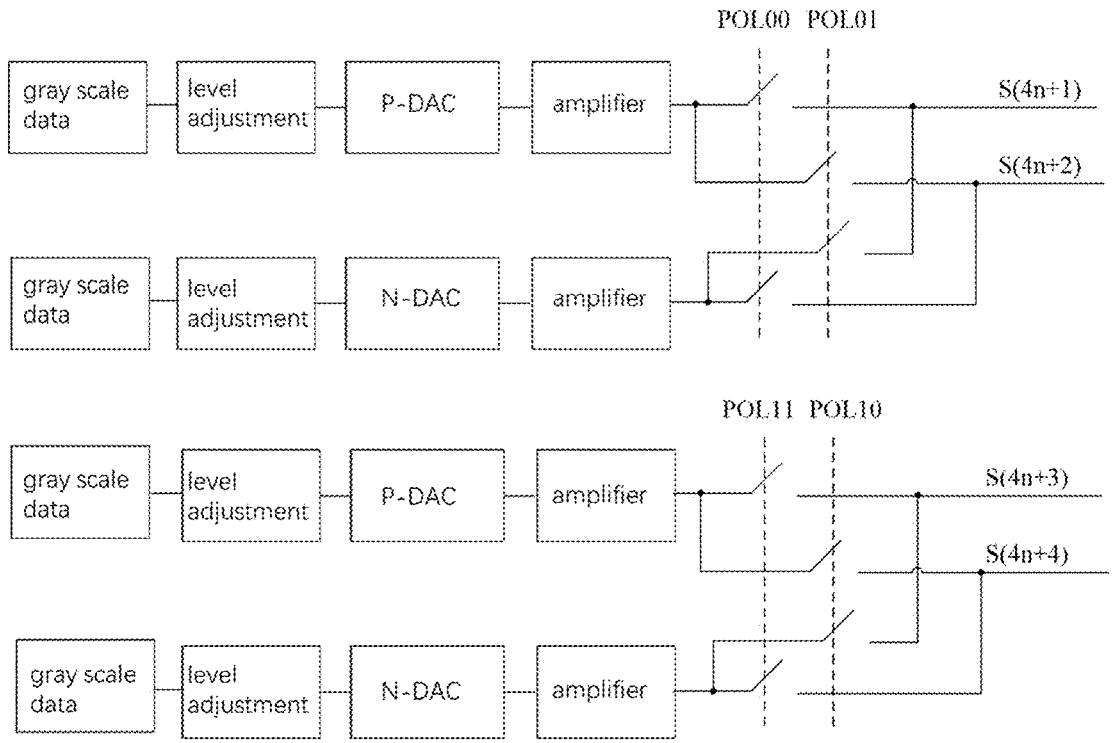
FIG. 9 is a schematic diagram illustrating a logic process of generating data voltages of data lines in a display panel according to an embodiment of the present disclosure.

Referring to FIG. 9, the data voltages applied to the data lines may be obtained by: gray scale data representing the gray scales of the sub-pixels is subjected to a level adjustment (Lever Shifter), then respectively subjected to a positive polarity digital-to-analog conversion (P-DAC) or a negative polarity digital-to-analog conversion (N-DAC), and then subjected to corresponding amplifiers to obtain a positive polarity data voltage and a negative polarity data voltage. The two data voltages may be controlled by polarity control signals POL00, POL01, POL11 and POL10 to determine to be output to which of the data lines S(4n+1), S(4n+2), S(4n+3) and S(4n+4), so that each data line obtains a data voltage of a corresponding polarity, where n is a natural number.

Specifically, referring to FIG. 9, in related art, every four adjacent data lines S(4n+1), S(4n+2), S(4n+3) and S(4n+4) are considered as a group of data lines, four polarity control signals POL00, POL01, POL11 and POL10 may be preset for each group of data lines, and all different groups of data lines may be controlled synchronously by the four polarity control signals POL00, POL01, POL11 and POL 10.

In a certain frame, when the polarity control signals POL00 and POL11 are active signals (e.g., equal to 1) and the polarity control signals POL01 and POL10 are inactive signals (e.g., equal to 0), the polarity of the sub-driving data pieces of the sub-pixels corresponding to the odd-numbered data lines S(4n+1) and S(4n+3) is positive, and the polarity of the sub-driving data pieces of the sub-pixels corresponding to the even-numbered data lines S(4n+2) and S(4n+4) is negative; in the next frame, the polarity control signals POL00 and POL11 become inactive signals and the polarity control signals POL01 and POL10 become active signals, so that the polarity of the sub-driving data pieces of the sub-pixels corresponding to the odd-numbered data lines S(4n+1), S(4n+3) becomes negative, and the polarity of the sub-driving data pieces of the sub-pixels corresponding to the even-numbered data lines S(4n+2), S(4n+4) becomes positive, thereby realizing "column inversion".

Figures 10, 11, 12:
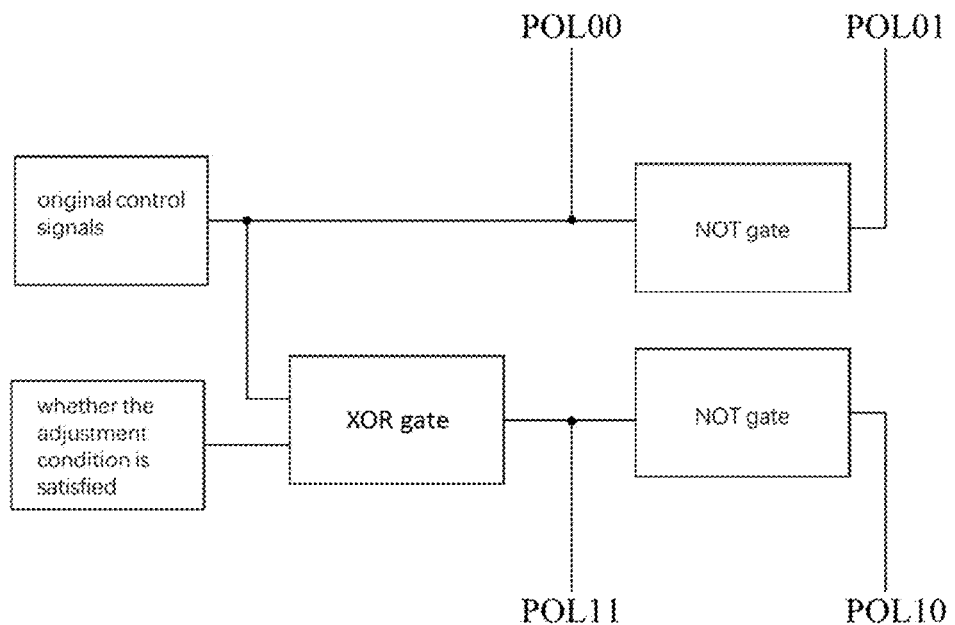
FIG. 10 is a schematic diagram illustrating a logic process of generating a polarity control signal in a display panel according to an embodiment of the present disclosure.
FIG. 11 is a schematic diagram of the heavy-duty image shown in FIG. 5 subjected to a polarity adjustment.
FIG. 12 is a schematic diagram of the heavy-duty image shown in FIG. 6 subjected to a polarity adjustment.

Referring to FIG. 10 and Table 1 below, the above polarity control signals POL00, POL01, POL11, POL10 may be further generated by: the original control signal is directly used as the polarity control signal POL00, and the polarity control signal POL00 passes through a NOT gate (an inverter) to be converted into the polarity control signal POL01; meanwhile, the original control signal and a judgment result of whether the adjustment condition is satisfied are input into an exclusive or (XOR) gate, an output of the XOR gate is used as the polarity control signal POL11, and the polarity control signal POL11 passes through a NOT gate (an inverter) to be converted into the polarity control signal POL10.

It can be seen that when the adjustment condition is not satisfied (i.e., the polarity adjustment is not needed), the judgment result of whether the adjustment condition is satisfied is 0, and thus when the original control signal is 1 and 0 (e.g., corresponding to two adjacent frames) respectively, the required polarity control signals and the polarities of data voltages corresponding to the data lines as shown in Table 1 can be obtained, i.e., the original driving data of conventional "column inversion" can be obtained.

TABLE 1

| logic relationship 1 of generations of polarity control signals | | | | | | | | | |
|---|---|---|---|---|---|---|---|---|---|
| whether the adjustment condition is satisfied | original control signal | POL 00 | POL 11 | POL 01 | POL 10 | polarity corresponding to S(4n + 1) | polarity corresponding to S(4n + 2) | polarity corresponding to S(4n + 3) | polarity corresponding to S(4n + 4) |
| 0 | 1 | 1 | 1 | 0 | 0 | positive | negative | positive | negative |
|   | 0 | 0 | 0 | 1 | 1 | negative | positive | negative | positive |

In some implementations, as a way of the embodiment of the present disclosure, the polarity adjustment includes: among the data lines that the gray scales of the sub-pixels corresponding thereto are not lower than the second threshold value, changing the polarities of the sub-driving data pieces of the sub-pixels corresponding to one data line every other data line.

As described above with reference to FIGS. 5 and 6, when the polarities of the sub-driving data pieces of the sub-pixels corresponding to each data line are the same and the polarities of the sub-driving data pieces of the sub-pixels corresponding to any adjacent data lines are opposite, the polarities of the sub-driving data pieces of all the brighter sub-pixels (the second kind sub-pixels) are the same, and thus the polarities of the data voltages loaded in the data lines corresponding to half of the brighter sub-pixels (the second kind sub-pixels) can be changed, and ratios of two polarities of sub-driving data pieces among the brighter sub-pixels (the second kind sub-pixels) subjected to the adjustment are substantially the same.

Specifically, for the data lines (for example, odd-numbered data lines) corresponding to the brighter sub-pixels (the second kind sub-pixels), the polarity of the sub-driving data pieces of the sub-pixels corresponding to one data line every other data line is changed, for example, the polarity of the sub-driving data pieces of the sub-pixels corresponding to the third data line and the seventh data line is changed, that is, the polarity of the sub-driving data pieces of the sub-pixels corresponding to one data line every other four data lines is changed.

Therefore, for the heavy-duty image shown in FIG. 5, according to the original polarity mode, the polarities corresponding to the columns of sub-pixels are in a form of "positive, negative, positive, negative, positive, negative", and the adjusted result is that, as shown in FIG. 11, the polarities corresponding to the columns of sub-pixels are in a form of "positive, negative, negative, negative, positive, negative, negative, negative, positive".

For the heavy-duty image shown in FIG. 6, according to the original polarity mode, the polarities corresponding to the columns of sub-pixels are in a form of "negative, positive, negative, positive, negative, positive, negative, positive", and the adjusted result is that, as shown in FIG. 12, the polarities corresponding to the columns of sub-pixels are in a form of "negative, positive, positive, positive, negative, positive, positive, positive".

In some implementations, as another way of the embodiment of the present disclosure, the polarity adjustment may include: dividing a portion of the data lines into adjustment groups, each of the adjustment groups is provided with two adjacent data lines, and any two adjacent adjustment groups are provided with two data lines which are not divided into the adjustment groups; and changing the polarities of the sub-driving data pieces of the sub-pixels corresponding to the data lines in all the adjustment groups.

As described above with reference to FIGS. 5 and 6, when the polarities of the sub-driving data pieces of the sub-pixels corresponding to each data line are the same and the polarities of the sub-driving data pieces of the sub-pixels corresponding to any adjacent data lines are opposite, the sub-driving data pieces of all the brighter sub-pixels (the second kind sub-pixels) have a same polarity, and thus the polarity adjustment can be performed by the following steps: exchanging the polarities of the sub-driving data pieces of the sub-pixels corresponding to two data lines every other two data lines (e.g., the polarities of the sub-driving data pieces of the sub-pixels corresponding to the second data line and the third data line are exchanged, and the polarities of the sub-driving data pieces of the sub-pixels corresponding to the sixth data line and the seventh data line are exchanged).

Figures 13, 14:
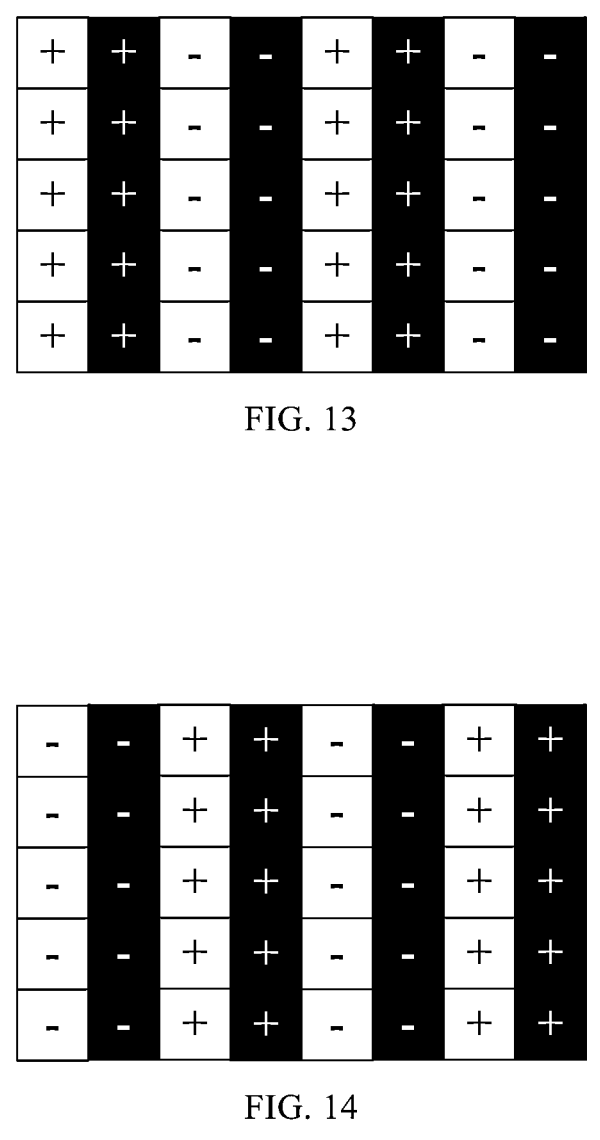

Thus, referring to the heavy-duty image of FIG. 5, the adjusted result is that, as shown in FIG. 13, the polarities corresponding to the columns of sub-pixels are in a form of "negative, negative, positive, positive, negative, negative, positive, positive".

Referring to the heavy-duty image of FIG. 6, the adjusted result is that, as shown in FIG. 14, the polarities corresponding to the columns of sub-pixels are in a form of "negative, negative, positive, positive, negative, negative, positive, positive".

That is, the image adjusted in the above manner is in a form of "inversion every two columns".

According to the above polarity adjustment manner, referring to FIGS. 13 and 14, a polarity arrangement of the sub-driving data pieces of the second kind sub-pixels (the brighter sub-pixels) is substantially uniform after the adjustment, and a polarity arrangement of the sub-driving data pieces of the first kind sub-pixels (the darker sub-pixels) is also substantially uniform, so that a better display effect can be obtained.

As mentioned above, when the structure with reference to FIG. 9 is adopted to generate the corresponding data voltages for the data lines, the above polarity control signals POL00, POL01, POL11, POL10 may be further generated by: referring to FIG. 10 and Table 2, since the polarity adjustment is necessary at this time, the original driving data must satisfies the adjustment condition, and the judgment result of whether the adjustment condition is satisfied is 1, and thus in a case where the original control signals remain unchanged, the polarity control signals POL00 and POL01 remain unchanged while the polarity control signals POL11 and POL10 are naturally inverted by an NAND gate, thereby achieving a purpose of "polarity exchanging" for two data lines every two data lines.

TABLE 2 logical relationship 2 of generations of polarity control signals

| whether the adjustment condition is satisfied | original control signal | POL 00 | POL 11 | POL 01 | POL 10 | S(4n + 1) corresponding to polarity | S(4n + 2) corresponding to polarity | S(4n + 3) corresponding to polarity | S(4n + 4) corresponding to polarity |
|---|---|---|---|---|---|---|---|---|---|
| 1 | 1 | 1 | 0 | 0 | 1 | positive | negative | negative | positive |
|   | 0 | 0 | 1 | 1 | 0 | negative | positive | positive | negative |

Therefore, the polarity exchanging can be realized naturally according to the fact whether the original driving data satisfies the adjustment condition, and thus the polarity exchanging is simplest.

Figure 15:
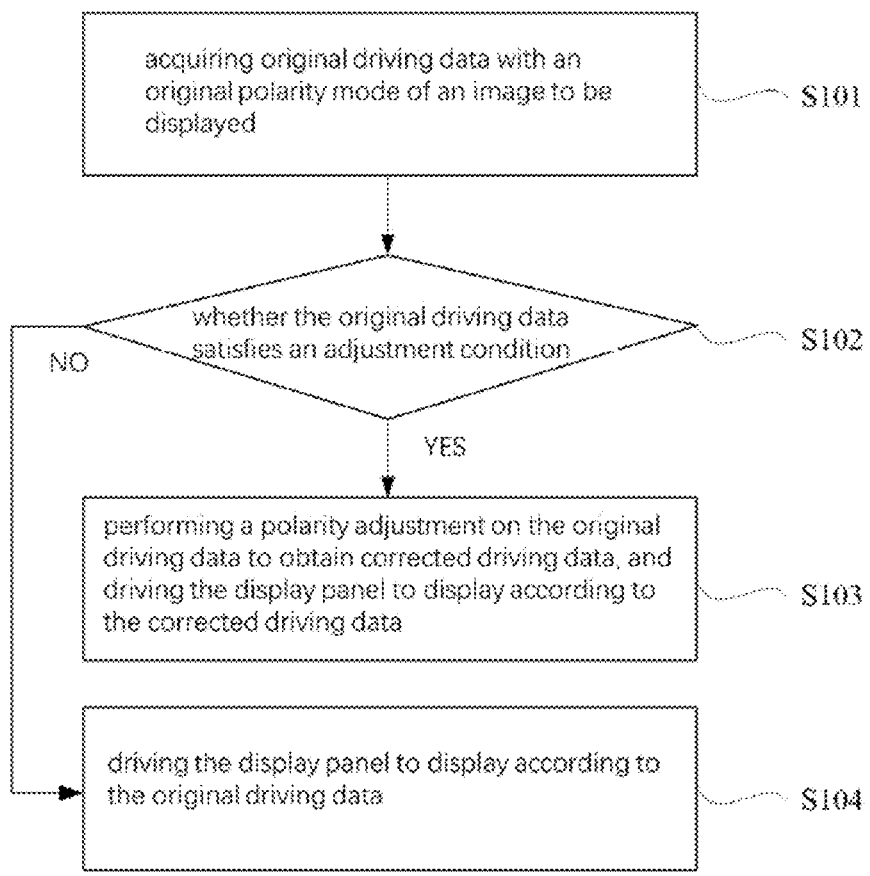
FIG. 15 is a flowchart of another method for driving a display panel according to an embodiment of the present disclosure.

In some implementations, referring to FIG. 15, the method of embodiment of the present disclosure further includes:

S104, in response to that the original driving data is judged not to satisfy the adjustment condition, driving the display panel to display according to the original driving data.

Obviously, when the original driving data is judged not to satisfy the adjustment condition, the display panel can be driven to display directly according to the original driving data without causing defects, and thus the display panel can be directly driven to display according to the original driving data with the original polarity mode.

Figure 16:
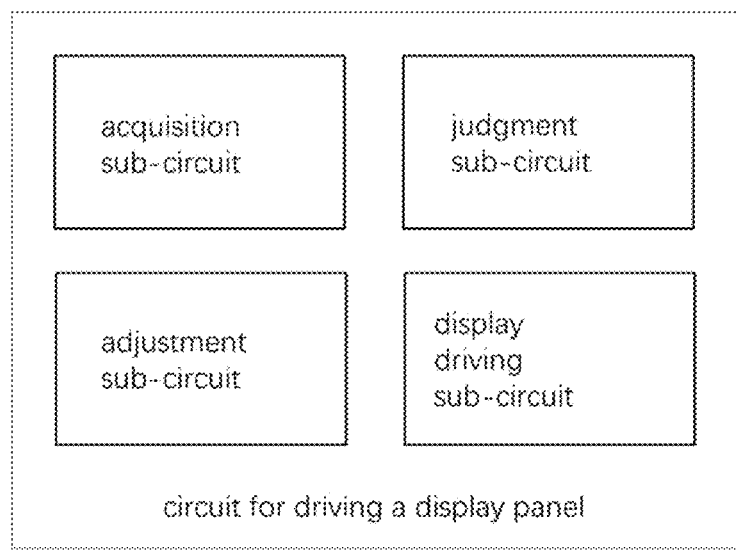
FIG. 16 is a block diagram illustrating a circuit for driving a display panel according to an embodiment of the present disclosure.

In a second aspect, referring to FIG. 16, an embodiment of the present disclosure provides a circuit for driving a display panel, including:

an acquisition sub-circuit configured to acquire original driving data with an original polarity mode of an image to be displayed, and the original driving data includes a plurality of sub-driving data pieces; the original polarity mode includes: polarities of all the sub-driving data pieces are divided into two kinds; the sub-driving data pieces corresponding to a gray scale not exceeding a first threshold value are called first kind sub-driving data pieces, the sub-driving data pieces corresponding to a gray scale not less than a second threshold value are called second kind sub-driving data pieces, and the second threshold value is larger than the first threshold value;

a judgment sub-circuit configured to judge whether the original driving data satisfies an adjustment condition; the adjustment condition include: the original driving data includes the first kind sub-driving data pieces and the second kind sub-driving data pieces, and numbers of the sub-driving data pieces with two polarities in the second kind sub-driving data pieces are different;

an adjustment sub-circuit configured to adjust a polarity of the original driving data to obtain corrected driving data in response to that the original driving data satisfies the adjustment condition;

a display driving sub-circuit configured to drive the display panel to display according to the corrected driving data in response to that the original driving data satisfies the adjustment condition.

The circuit for driving the display panel of the embodiment of the present disclosure can implement the method for driving the display panel.

Figure 17:
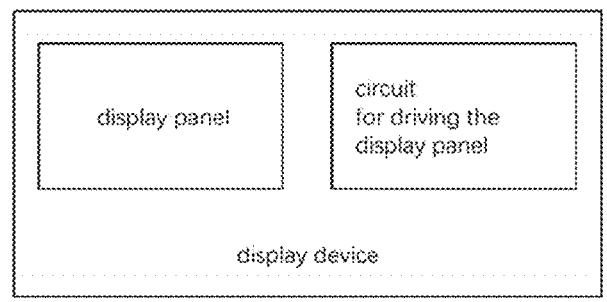
FIG. 17 is a block diagram illustrating a display device according to an embodiment of the present disclosure.

In a third aspect, referring to FIG. 17, an embodiment of the present disclosure provides a display device including:

a display panel;

the circuit as described above for driving the display panel.

The display device (liquid crystal display device) according to the embodiment of the present disclosure can implement the method for driving the display panel.

In some implementations, each row of sub-pixels of the display panel corresponds to one gate line;

the display panel includes a common electrode, and the common electrode is divided into a plurality of common electrode blocks in a column direction;

the display panel is a touch display panel, and each of the common electrode blocks is multiplexed as a touch electrode;

each column of sub-pixels of the display panel corresponds to one data line.

Figure 18:
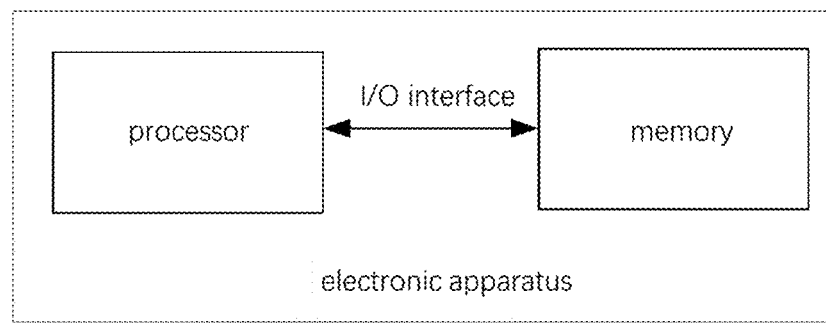
FIG. 18 is a block diagram of an electronic apparatus according to an embodiment of the present disclosure.

In a fourth aspect, with reference to FIG. 18, an embodiment of the present disclosure provides an electronic apparatus, including:

one or more processors;

a memory on which one or more programs are stored, the programs, when executed by the one or more processors, cause the one or more processors to implement the method for driving the display panel described above;

one or more I/O interfaces coupled between the processors and the memory and configured to realize information interaction between the processors and the memory.

The electronic apparatus of the embodiment of the present disclosure can implement the method for driving the display panel described above.

The processor is a device with data processing capability, which includes but is not limited to a Central Processing Unit (CPU) and the like; the memory is a device with data storage capability, which includes, but is not limited to, random access memory (RAM, more specifically SDRAM, DDR, etc.), Read Only Memory (ROM), Electrically Erasable Programmable Read Only Memory (EEPROM), FLASH memory (FLASH); the I/O interface (read/write interface) is coupled between the processors and the memory, configured to implement information interaction between the memory and the processors, and includes, but is not limited to, a data Bus (Bus) and the like.

Figure 19:
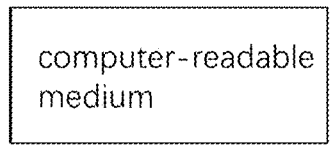
FIG. 19 is a block diagram of a computer-readable medium according to an embodiment of the present disclosure.

In a fifth aspect, referring to FIG. 19, an embodiment of the present disclosure provides a computer-readable medium on which a computer program is stored, the program is executed by a processor to implement the method for driving the display panel described above.

The computer-readable medium of the embodiment of the present disclosure can implement the method for driving the display panel described above.

One of ordinary skill in the art will appreciate that all or some of the steps, the system, functional modules/units in the device, disclosed above may be implemented as software, firmware, hardware, and suitable combinations thereof.

In a hardware implementation, the division between the functional modules/units mentioned above does not necessarily correspond to the division of physical components; for example, one physical component may have multiple functions, or one function or step may be performed by several physical components in cooperation.

Some or all of the physical components may be implemented as software executed by a processor, such as a Central Processing Unit (CPU), digital signal processor, or microprocessor, or as hardware, or as an integrated circuit, such as an application specific integrated circuit. Such software may be distributed on computer-readable media, which may include computer storage media (or non-transitory medium) and communication medium (or transitory medium). The term computer storage medium includes volatile and nonvolatile, removable and non-removable medium implemented in any method or technology for storage of information such as computer-readable instructions, data structures, program modules or other data, as is well known to those skilled in the art. Computer storage medium includes, but is not limited to, random access memory (RAM, more specifically SDRAM, DDR, etc.), Read Only Memory (ROM), Electrically Erasable Programmable Read Only Memory (EEPROM), FLASH memory (FLASH), or other disk storage; compact disk read only memory (CD-ROM), Digital Versatile Disk (DVD), or other optical disk storage; magnetic cassettes, magnetic tape, magnetic disk storage or other magnetic storage; any other medium which can be used to store desired information and can be accessed by a computer. In addition, the communication medium typically embodies computer readable instructions, data structures, program modules or other data in a modulated data signal such as a carrier wave or other transport mechanism and includes any information delivery medium as is well known to those skilled in the art.

The present disclosure has disclosed example embodiments, and although specific terms are employed, they are used and should be interpreted in a generic and descriptive sense only and not for a purpose of limitation. In some instances, features, characteristics and/or elements described in conjunction with a particular embodiment may be used alone or in combination with features, characteristics and/or elements described in conjunction with other embodiments, unless expressly stated otherwise, as would be apparent to one skilled in the art. It will, therefore, be understood by those skilled in the art that various changes in form and details may be made therein without departing from the scope of the present disclosure as set forth in the appended claims.

The invention claimed is:

1. A method for driving a display panel, comprising:
    acquiring original driving data with an original polarity mode of an image to be displayed, wherein the original driving data comprises a plurality of sub-driving data pieces; the original polarity mode comprises: dividing polarities of all the sub-driving data pieces into two kinds; the sub-driving data pieces corresponding to a gray scale not exceeding a first threshold value are called first kind sub-driving data pieces, the sub-driving data pieces corresponding to a gray scale not less than a second threshold value are called second kind sub-driving data pieces, and the second threshold value is larger than the first threshold value;
    judging whether the original driving data satisfies an adjustment condition; the adjustment condition comprises: the original driving data comprises the first kind sub-driving data pieces and the second kind sub-driving data pieces, and numbers of the sub-driving data pieces with two polarities among the second kind sub-driving data pieces are different;
    in response to that the original driving data is judged to satisfy the adjustment condition, performing a polarity adjustment on the original driving data to obtain corrected driving data, and driving the display panel to display according to the corrected driving data,
    wherein, among the second kind sub-driving data pieces of the original driving data, a ratio of a relative larger number of sub-driving data pieces with one of the polarities is a first ratio;
    among the second kind sub-driving data pieces of the corrected driving data, the number of the sub-driving data pieces of a first polarity is greater than or equal to the number of the sub-driving data pieces of a second polarity, and the ratio of the number of the sub-driving data pieces of the first polarity is a second ratio;
    the second ratio is less than the first ratio.

2. The method according to claim 1, wherein the adjustment condition comprises:
    among the second kind sub-driving data pieces, a ratio of a relative larger number of sub-driving data pieces with one of the polarities is greater than or equal to 75%.

3. The method according to claim 1, wherein the adjustment condition comprises:
    all the second kind sub-driving data pieces have the same polarity.

4. The method according to claim 1, wherein,
    among the second kind sub-driving data pieces of the corrected driving data, numbers of the sub-driving data of two polarities are substantially equal.

5. The method according to claim 1, wherein the adjusting the polarity of the original driving data to obtain the corrected driving data comprises:
    among the second kind sub-driving data pieces of the original driving data, the polarities of a portion of the sub-driving data pieces in the larger number of sub-driving data pieces of the polarity are changed.

6. method according to claim 1, wherein the original polarity mode comprises:
    total numbers of the sub-driving data pieces of two polarities are approximately equal.

7. The method according to claim 1, wherein,
    the first threshold value is a 0 gray level,
    the second threshold value differs from the first threshold value by at least 48 gray levels.

8. The method according to claim 1, wherein the original polarity mode comprises:
    the polarities of the sub-driving data pieces of the sub-pixels corresponding to any one data line are the same, and the polarities of the sub-driving data pieces of the sub-pixels corresponding to any two adjacent data lines are different.

9. The method according to claim 8, wherein the adjusting the polarity of the original driving data to obtain the corrected driving data comprises:
    for the data lines that gray scales of the sub-pixels corresponding thereto are at least partially not lower than the second threshold value, changing the polarity of the sub-driving data pieces of the sub-pixels corresponding to a portion of the data lines.

10. The method according to claim 8, wherein the adjustment condition comprises:
    for any two adjacent data lines, the gray scales of the sub-pixels corresponding to one data line are not more than the first threshold value, and the gray scales of the sub-pixels corresponding to the other data line are not less than the second threshold value.

11. The method according to claim 10, wherein the adjusting the polarity of the original driving data to obtain the corrected driving data comprises:
    for the data lines that the gray scales of the sub-pixels corresponding thereto are not lower than the second threshold value, changing the polarity of the sub-driving data pieces of the sub-pixels corresponding to one data line every other data line.

12. The method according to claim 10, wherein the adjusting the polarity of the original driving data to obtain the corrected driving data comprises:
    dividing a portion of the data lines into adjustment groups, wherein each of the adjustment groups is provided with two adjacent data lines, and any two adjacent adjustment groups are provided with two data lines which are not divided into the adjustment groups;
    changing the polarity of the sub-driving data pieces of the sub-pixels corresponding to the data lines in all the adjusting groups.

13. The method according to claim 1, further comprising:
    in response to that the original driving data is judged not to satisfy the adjustment condition, driving the display panel to display according to the original driving data.

14. The method according to claim 1, wherein,
each row of sub-pixels of the display panel corresponds to one gate line;
the display panel comprises a common electrode, and the common electrode is divided into a plurality of common electrode blocks in a column direction.

15. A circuit for driving a display panel, comprising:
an acquisition sub-circuit configured to acquire original driving data with an original polarity mode of an image to be displayed, the original driving data including a plurality of sub-driving data pieces; the original polarity mode comprises: dividing polarities of all the sub-driving data pieces into two kinds; the sub-driving data pieces corresponding to a gray scale not exceeding a first threshold value are called first kind sub-driving data pieces, the sub-driving data pieces corresponding to a gray scale not less than a second threshold value are called second kind sub-driving data pieces, and the second threshold value is larger than the first threshold value;
a judgment sub-circuit configured to judge whether the original driving data satisfies an adjustment condition; the adjustment condition comprises: the original driving data comprises the first kind sub-driving data pieces and the second kind sub-driving data pieces, and numbers of the sub-driving data pieces with two polarities among the second kind sub-driving data pieces are different;
an adjustment sub-circuit configured to adjust the polarity of the original driving data to obtain corrected driving data in response to that the original driving data satisfies the adjustment condition;
a display driving sub-circuit configured to drive the display panel to display according to the corrected driving data in response to that the original driving data satisfies the adjustment condition,
wherein, among the second kind sub-driving data pieces of the original driving data, a ratio of a relative larger number of sub-driving data pieces with one of the polarities is a first ratio;
among the second kind sub-driving data pieces of the corrected driving data, the number of the sub-driving data pieces of a first polarity is greater than or equal to the number of the sub-driving data pieces of a second polarity, and the ratio of the number of the sub-driving data pieces of the first polarity is a second ratio;
the second ratio is less than the first ratio.

16. A display device, comprising:
a display panel;
the circuit for driving the display panel according to claim 15.

17. The display device according to claim 16,
each row of sub-pixels of the display panel corresponds to one gate line;
the display panel comprises a common electrode, and the common electrode is divided into a plurality of common electrode blocks in a column direction;
the display panel is a touch display panel, and each of the common electrode blocks is multiplexed as a touch electrode;
each column of sub-pixels of the display panel corresponds to one data line.

18. An electronic apparatus, comprising:
one or more processors;
a memory on which one or more programs are stored, the programs, when executed by the one or more processors, cause the one or more processors to implement the method for driving the display panel according to claim 1;
one or more I/O interfaces coupled between the processors and the memory and configured to realize information interaction between the processors and the memory.

19. A computer-readable medium, on which a computer program is stored, the computer program, when being executed by a processor, realizes the method for driving the display panel according to claim 1.

* * * * *